United States Patent
Lehl et al.

(10) Patent No.: US 9,738,361 B1
(45) Date of Patent: Aug. 22, 2017

(54) DEVICE AND METHOD FOR AUTONOMOUSLY SEEKING, THEN MAINTAINING A CONSTANT DEPTH WHILE IN MOTION THROUGH THE WATER EITHER BY RETRIEVAL OR BEING TOWED

(71) Applicants: Jeremy A. Lehl, Macomb, MI (US); Michael Bryan Ross Smith, Knoxville, TN (US)

(72) Inventors: Jeremy A. Lehl, Macomb, MI (US); Michael Bryan Ross Smith, Knoxville, TN (US)

( * ) Notice: Subject to any disclaimer, the term of this patent is extended or adjusted under 35 U.S.C. 154(b) by 0 days.

(21) Appl. No.: 15/090,623

(22) Filed: Apr. 5, 2016

(51) Int. Cl.
*B63G 8/18* (2006.01)
*B63G 8/14* (2006.01)
*B63G 8/42* (2006.01)

(52) U.S. Cl.
CPC ............... *B63G 8/14* (2013.01); *B63G 8/42* (2013.01); *B63G 8/18* (2013.01)

(58) Field of Classification Search
CPC ... B63G 8/14; B63G 8/18; B63G 8/42; A01K 85/00; G01V 1/3826; F42B 19/04; B63B 2723/00
See application file for complete search history.

(56) References Cited

U.S. PATENT DOCUMENTS

| | | | | |
|---|---|---|---|---|
| 2,928,367 A * | 3/1960 | McCormick | ............ | F42B 19/04 114/245 |
| 3,412,704 A * | 11/1968 | Buller | .................... | B63B 21/66 114/245 |
| 3,435,797 A * | 4/1969 | Chapman | ................ | B63B 21/66 114/245 |
| 3,440,992 A * | 4/1969 | Chance | ................... | B63B 21/66 114/245 |
| 3,973,350 A * | 8/1976 | England | ................. | A01K 91/20 43/42.03 |
| 4,028,839 A * | 6/1977 | Stubblefield | ............ | G07F 15/12 43/42.03 |
| 6,804,910 B1 * | 10/2004 | Sharp | ..................... | A01K 85/16 43/42.22 |

* cited by examiner

*Primary Examiner* — Andrew Polay

(57) ABSTRACT

The present invention is a submersible device comprising a body encasing an enclosed compressible void capable of physically responding to changes in ambient pressure imparted by the device's depth underwater. This physical response to pressure changes actuates a dynamic dive plane. The forces imparted on the dive plane by the motion of the device through the water drives the device to seek, achieve and then maintain a predetermined depth. This device can be used for fishing applications and other underwater activities that benefit from dynamic depth control.

2 Claims, 4 Drawing Sheets

DEVICE AND METHOD FOR AUTONOMOUSLY SEEKING, THEN MAINTAINING A CONSTANT DEPTH WHILE IN MOTION THROUGH THE WATER EITHER BY RETRIEVAL OR BEING TOWED

BACKGROUND OF THE INVENTION

The present state of the art regarding a device that will seek to achieve a constant depth while traveling through a body of water includes, but is not limited to, fishermen attempting to retrieve a lure via traditional methods, and/or troll a fishing lure that will seek and ultimately maintain a constant depth in the water. The purpose of attempting to target a specific depth in water while fishing is a typical desire of most fishermen. Present methods using current products for depth-specific-fishing, while in motion, require a considerable amount of skill as to the retrieval/trolling speed of the lure and scope of the fishing line. Scope of the fishing line refers to the length of fishing line from the fisherman to the device. Therefore, there is a need for a device capable of achieving and then maintaining a constant depth while traveling through the water requiring minimal skill on the part of the user to achieve this task.

BRIEF DESCRIPTION OF THE INVENTION

The present invention is a device comprising a dynamic dive plane [1] connected to a compressible void [3] located in the body [2] of the device, wherein the device is submerged in salt or fresh water and while in motion, seeks to achieve a constant depth with minimal effect by retrieval, towing speed or scope of line. The invention further comprises a method of maintaining the accomplished depth while traveling through the water by responding to ambient pressure changes. These pressure changes acting on the compressible void [3] physically control the dive plane's [1] angle of attack. The angle of attack relative to the forward motion of the device is the mechanism that allows the device to seek and maintain a target depth.

DETAILED DESCRIPTION OF THE INVENTION

The present invention embodies a device comprising a dynamic dive plane [1] connected to a compressible void [3] located inside the body [2] of the device, wherein the device is submersible in salt or fresh water and seeks to achieve and then maintain a constant depth in the water as the device is retrieved or towed through the water. In further embodiments, the dive plane [1] is initially set so that at the surface of the water, the attitude of the dive plane [1] is angled down. In further embodiments, once the device is in forward motion, the dive plane's [1] angle of attack in relation to the forward motion causes the device to descend in the water. As the device descends, the increasing depth of the device experiences an increase in ambient pressure which causes the compressible void [3] to compress. In further embodiments, the compression of the internal compressible void [3] causes the inner lever arm [5] of the dive plane [1] to be pull backward from its original position. This backward motion of the lever arm [5] causes the dive plane [1] to rotate about a pivot point [4] which decreases the dive plane's [1] angle of attack. In further embodiments, the decreased angle of attack, as related to the dive plane [1], lessens the dive force imparted on the device, thereby decreasing the tendency of the device to descend further in the water. In further embodiments, once the device has reached the target depth and the dive plane [1] is at an angle of attack that imparts no vertical dive forces, any rise of the device in the water causes the compressible void [3] to expand which pushes the lever arm [5] forward. This forward motion of the lever arm [5] causes the angle of attack to increase thus resulting in the dive force returning which increases the device's tendency to dive deeper in the water. In further embodiments should the device surpass the target depth, the compressible void [3] responds by continuing to pull the lever arm [5] of the dive plane [1] backwards. This backward motion of the lever arm [5] continues to rotate the dive plane [1] past the angle where there are no vertical dive forces imparted on the device and to an angle that causes the dive plane [1] to exert an upward dive force on the device. This upward dive force compels the device to return to the previously surpassed target depth.

In further embodiments, the volume of the compressible void [3] and length of the lever arm [5] in relation to the pivot point [4] dictate the target depth of the device. In further embodiments, the device may be a fishing lure, a camera or any device the operator may use for the purposes of maintaining a constant depth while traveling horizontally through water regardless of retrieval or trolling speed. The body [2] of the device may comprise any material capable of forming and encasing the appropriate mechanisms required for the pre-described purposes. The compressible void [3] may comprise any material capable of performing the pre-described purposes of dynamic response to changes in ambient pressure imparted by the corresponding changes in water depth.

Figure 1:
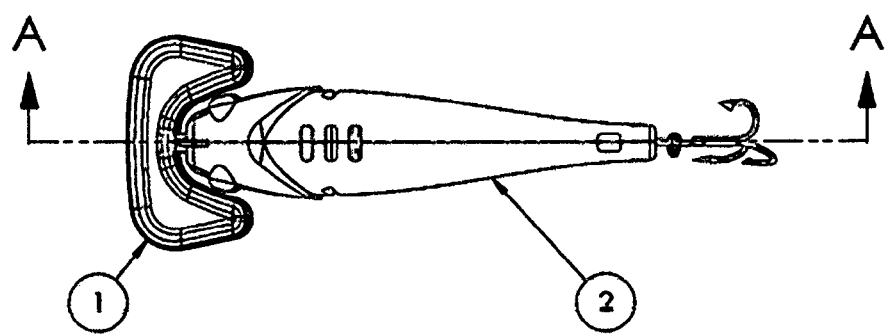
FIG. 1: Top view of the device with forward dive plane configuration.
Figure 2:
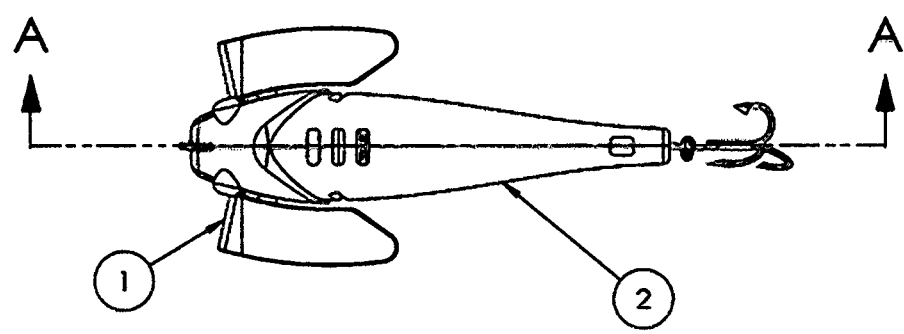
FIG. 2: Top view of the device with mid-body dive plane configuration.
Figure 3:
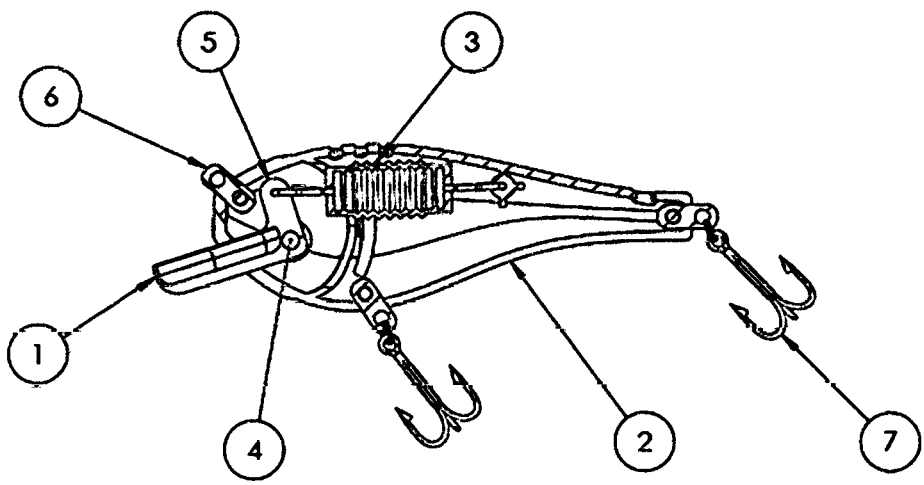
FIG. 3: Side view of the device with the forward dive plane configuration.
Figure 4:
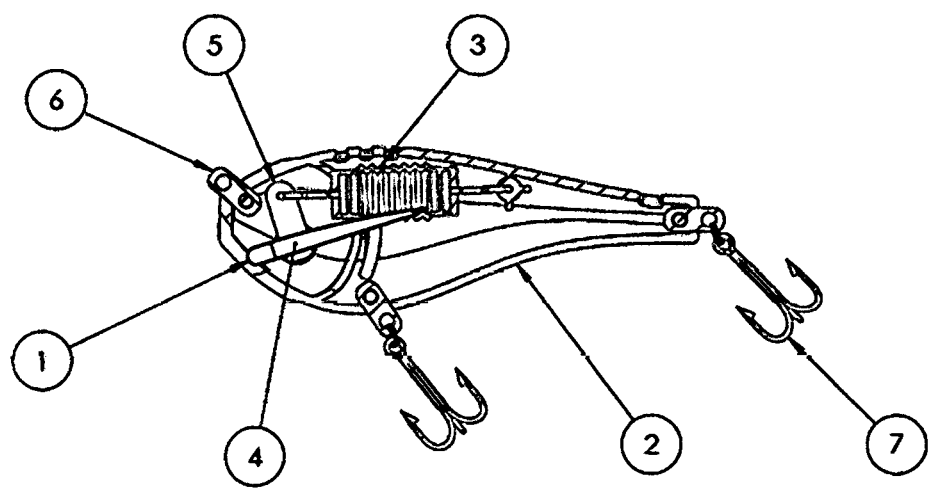
FIG. 4: Side view of the device with the mid-body dive plane configuration.

1. The dynamic dive plane [1], wherein the dive plane [1] may vary in shape, size, location on the body [2] and appearance.
2. The body [2] of the device, wherein the body [2] may vary in shape, size and appearance.
3. The compressible void [3] within the body [2].
4. The pivot point [4] of the dynamic dive plane [1].
5. The lever arm [5] is attached to the compressible void [3] and the dynamic dive plane [1].
6. The point [6] of connection for the line attached to the device for pulling or towing.
7. The hook [7], for instance, when used as a device for catching fish; a camera, or any other device the user might attach to the body [2].

The invention claimed is:
1. A submersible device with a pressure-actuated dive plane for controlling depth comprising:
A submersible body exposed to an ambient pressure,
A tow point on an exterior surface of the submersible body,
A fishing hook on an exterior surface of the submersible body,
A compressible bellows housed inside the submersible body,

A connecting rod fixed to the bellows at an aft end of the connecting rod and fixed to a lever at a forward end of the connecting rod, The lever rotates about a fixed pivot point, The lever is fixed to a dive plane that rotates about the fixed pivot point, Wherein a change in the ambient pressure on the bellows causes an axial translation in the connecting rod that rotates said lever in order to control the rotation of the dive plane about the fixed pivot point.

2. A fishing lure comprising the submersible device of claim 1.

* * * * *